United States Patent [19]

Hassan et al.

[11] Patent Number: 5,481,532
[45] Date of Patent: Jan. 2, 1996

[54] MOBILE TELECOMMUNICATIONS DEVICE AND SERVICE

[75] Inventors: Amer A. Hassan, Cary, N.C.; John E. Hershey, Ballston Lake, N.Y.; Howard L. Lester, Alplaus, N.Y.; Charles M. Puckette, Scotia, N.Y.

[73] Assignee: General Electric Company, Schenectady, N.Y.

[21] Appl. No.: 267,347

[22] Filed: Jun. 29, 1994

[51] Int. Cl.⁶ .................................... H04J 3/26
[52] U.S. Cl. ................ 370/16; 370/94.1; 370/97; 455/33.1
[58] Field of Search .............. 370/13.1, 16, 94.1, 370/95.1, 95.3, 97; 455/33.1, 33.4

[56] References Cited

U.S. PATENT DOCUMENTS 5,276,686  1/1994  Ito ............................................. 370/95.1

*Primary Examiner*—Melvin Marcelo
*Attorney, Agent, or Firm*—Lawrence P. Zale; Marvin Snyder

[57] ABSTRACT

A highly fault tolerant method of radio communication of information in the form of a message packet employs a distributed network of transmitter/receivers 'transceivers' each having a unique identification ("ID") number. An initiating transceiver creates a message packet having the ID of a transceiver intended to receive the message packet. It then broadcasts the message packet to transceivers within its transmission range. Each transceiver which receives the message packet checks to see if there are errors and sends an acknowledgement if no errors. The transceivers determine valid message packets by determining if the message has not expired, if it has not been seen before and there were no errors in the received message packet. The transceiver also determines if the transceiver ID in the message packet match its own transceiver ID, and if it does, is the message has been successfully transmitted to its intended transceiver. If the message packet is valid and the transceiver IDs do not match, the transceiver broadcasts the message to other local transceivers until a predetermined number of acknowledgements are received, or until the message expires. The transceivers which receive the message packet repeat the process.

4 Claims, 5 Drawing Sheets

MOBILE TELECOMMUNICATIONS DEVICE AND SERVICE

CROSS REFERENCE TO RELATED APPLICATIONS

This invention is related to U.S. patent applications (Atty. Docket No. RD-23,754) "Datagram Message Communication Service Employing a Hybrid Network" by John Hershey, Ser. No. 08/267,348; (Atty. Docket No. RD-23,752) "Datagram Communication Service over a Cellular Telephone Network" by John Hershey, Amer Hassan, Ser. No. 08/267,328; and (Atty. Docket No. RD-23,753) "Parallel Dataword Modulation Scheme" by John Hershey, Gary Saulnier, Ser. No. 08/267,346 all assigned to the present assignee and hereby incorporated by reference.

BACKGROUND OF THE INVENTION

1. Field of the Invention

The present invention relates to the field of digital radio transmission and more specifically transmitting data with the use of radio repeaters.

2. Description of Related Art

Radio transmission tends to be a problem in areas, such as cities, having high rise buildings. The buildings tend to block radio transmissions and cause 'shadowing'. A transmitter/receiver 'transceiver' communicating with radiowave signals has to contend with these shadowing effects. This problem tends to be worse when at least one of the transceivers is a mobile unit. As the mobile unit moves into an area which experiences shadowing, the received signal is attenuated, has multipath interference, and may reduce the signal quality to a degree that the message may not be received at all.

One method of combating shadowing is to position repeaters having antennae dispersed around an area in which radio communication is desired. Antenna rental space has become increasingly more costly causing this me/hod to become increasingly unattractive. There is also an increasing demand for information transmission, worsening the problem.

Message transmission becomes very costly, slow and complex when the system is driven by a 'master' controller which organizes the transceivers under its control. The control communication, between the 'master' and its transceivers, not part of messages to be delivered, or 'overhead', adds to the communication traffic. The transceivers also wait idle until it is their turn to send or receive messages. As more transceivers are added, and/or the message traffic increases, the 'master' becomes overloaded and becomes the limiting factor in message transmission.

Currently there is a need for a method of transmitting information which is simple, inexpensive, and does not suffer from 'master' controller message transmission restrictions.

SUMMARY OF THE INVENTION

Information is transmitted over a network of mobile radio transceivers, each having a unique ID number, such as a mobile telephone number. An operator initiates a message at an initiating transceiver, which may be a 'storefront' type office or a mobile telephone. Information desired to be transmitted is formed into a message packet. A destination ID number of a transceiver to which this message is to be transmitted, is obtained from a database such as a telephone directory. The message packet is comprised of the ID of the intended recipient, a message ID number, a creation time stamp, a packet life, a minimum number of receivers to transmit the message to, the message information along with synchronization parameters and error detection bits. Other transceivers in the area may broadcast a low energy signal, allowing other transceiver to know that they are present. The sending transceiver broadcasts the message packet to other transceivers in the reception area. Each transceiver in the reception area which receives the message responds with an acknowledgement signal. Each transceiver which receives the broadcast first determines if the message has expired, by determining the age of the message by subtracting the current time from the creation time stamp, then comparing the age to the message life. Messages older than the message life are disregarded. The transceivers also determine if they have seen the message before. If the message has not been received before, then it compares ID number, N, with its own ID number. If they match, the message has been successfully transmitted to the intended transceiver. ff not, the message packet is re-broadcast to other transceivers within its radio transmission region. Since each transceiver disregards broadcasts which it has already seen, the broadcast generally propagates with a wavefront in a direction away from the initiating transceiver. Since there is a message life field, by adjusting the message life, the probable range over which the message is transmitted may be adjusted.

OBJECTS OF THE INVENTION

It is an object of the present invention is to provide a simple method of relaying information to a desired receiver in a mobile radio system.

Another object of the present invention is to provide a distributed network which is highly fault tolerant.

Another object of the present invention to provide a simple method of employing radio transmission to transmit information in a mobile radio system to a receiver unencumbered by the effects of 'shadowing'.

BRIEF DESCRIPTION OF THE DRAWINGS

The features believed to be novel are set forth with particularity in the appended claims. The invention itself, however, both as to organization and method of operation together with the further objects and advantages thereof may best be understood by reference to the following description in conjunction with the accompanying drawings in which:

DETAILED DESCRIPTION OF THE INVENTION

In radio communications, transmitter/receivers, "transceivers" receive and transmit information by radio waves. These transceivers is may be located on a mobile vehicle or positioned at a fixed "base station". Since radio waves may be blocked or partially blocked by objects of the environment, such as buildings, it is sometimes difficult to transmit from one transceiver to another transceiver at a given time due to their relative locations. At some time later, however, a mobile transceiver may move into a location which has a direct line of sight, is within the range of another transceiver, and does not experience any other radiowave transmission obstacles. At this time, both transceivers may communicate information.

Information desired to be transmitted may be data or digitized analog information. This information is stored as a message packet, which is then encoded and transmitted over a radio signal from one transceiver to another. Each transceiver also has a unique internal identification number "ID". Therefore, by each transceiver knowing its own ID and also knowing the ID of another transceiver to transmit to, message packets can be sent from one transceiver to another by relaying message packets to the intended transceiver.

Figure 1:
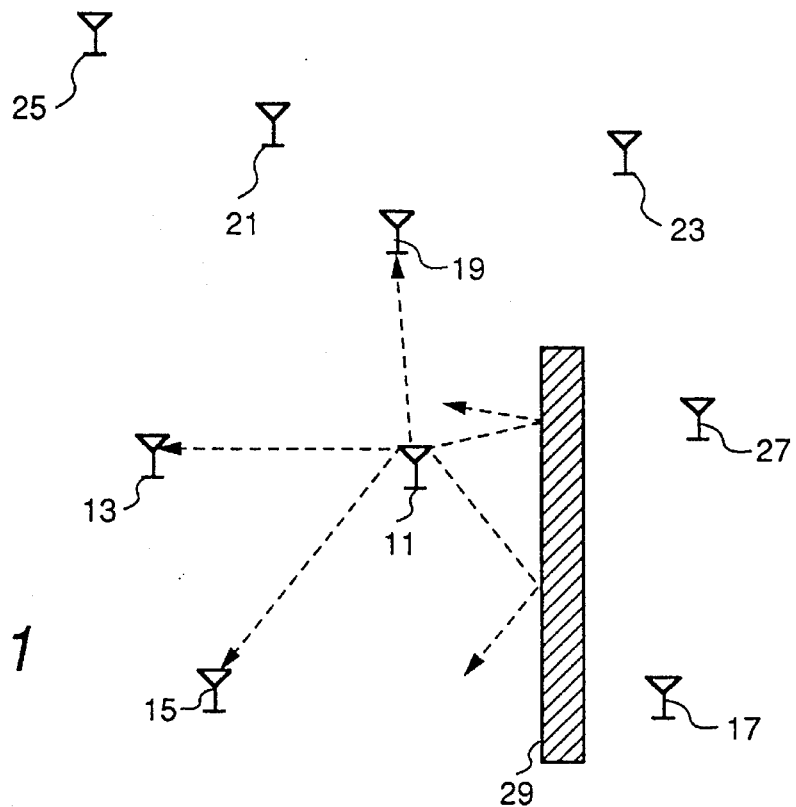
FIG. 1 is a drawing illustrating the problem of 'shadowing' in radio communications.

In FIG. 1, an operator at transceiver 11 would like to transmit to transceiver 27. Between transceiver 11 and transceiver 27 is some sort of radio barrier 29. Radio barrier 29 may be a physical barrier such as a mountain or buildings; or it may some other type of interference such as a local atmospheric disturbance, or stray radio frequency transmissions which impair the radio signal being transmitted from transceiver 11 to transceiver 27. Therefore, even though transceiver 27 is in close proximity to transceiver 11, transmission of a direct signal between the transceivers is received with little signal quality. In this case, transmission between the two will become inaccurate or garbled depending upon the degree of radio signal transmission attenuation or interference. Transceiver 11, however, may transmit to transceivers 13, 15 and 19, which are in its transmission range but do not experience the same radio signal transmission impairments, such as barrier 29.

The present invention is a low cost data message packet transportation service ideally suited for a large metropolitan area in which point to point communications are either impossible or costly. The present invention delivers message packets in a 'DATAGRAM' mode in that a packet is initiated and relayed with best effort for delivery with no guarantee, except at a possible higher level of the user protocol. The packets are relayed through a network of available mobile or fixed transceivers. The delivery time of a packet is expected to be highly variable. The service is not expected to meet the needs of real time communications such as voice but rather to address the needs of data transport.

Figure 2:
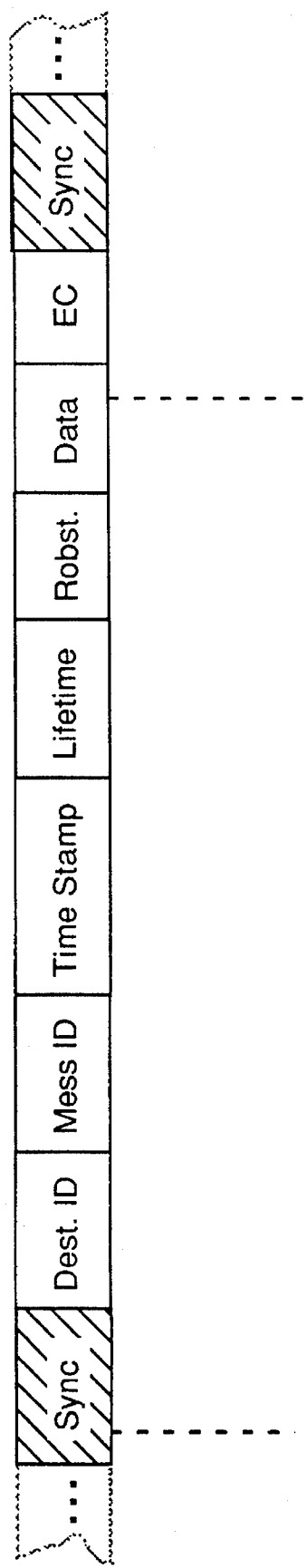
FIG. 2 is a proposed message packet structure compatible with the present invention.

The message packet fields compatible with the present invention are shown in FIG. 2. The fields are:

SYNCH: This is a unique word or "flag". As is common in bit-oriented protocols, it serves to both mark the beginning and termination of a data packet.

DESTINATION ID: The unique identification number of the transceiver intended to ultimately receive the message packet.

MESSAGE ID: This is the packet's identification number. It includes both the packer's originator's address and a packet number assigned by the packet originator.

TIME STAMP: This specifies the time the packet was launched into the network.

LIFETIME: The lifetime beyond which the packet will not be useful.

ROBUSTNESS: This integer specifies the minimum number of different receivers who must accept the packet.

DATA: The data or message to be conveyed by the packet.

EC: The error check—most likely an error detecting word/cyclic redundancy check (CRC).

Figure 3A:
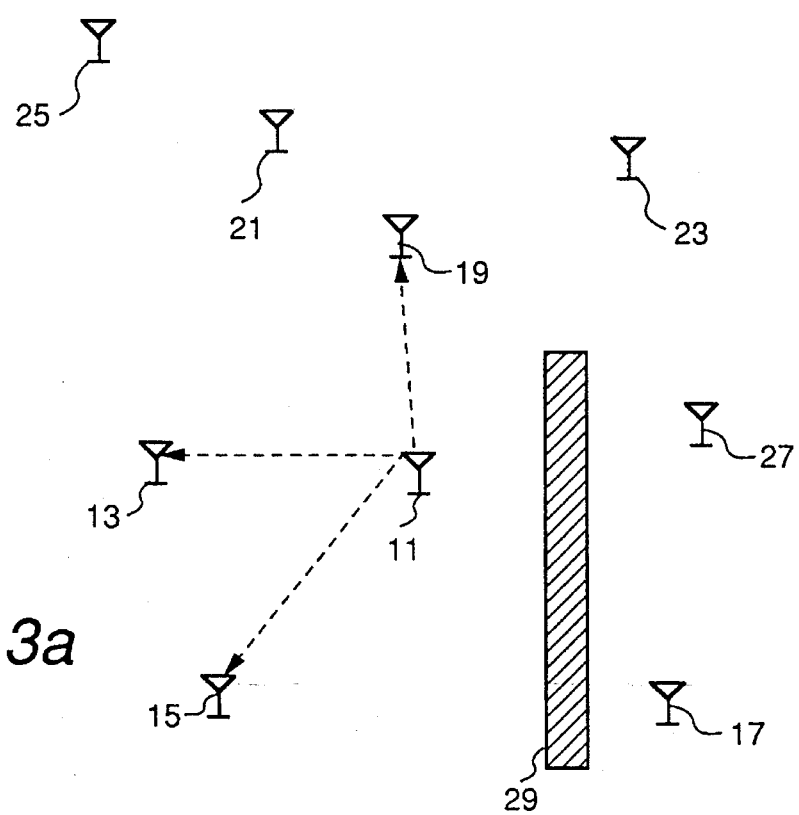
FIGS. 3a, 3b, and 3c together illustrate a method of message communication according to the present invention.
Figure 3B:
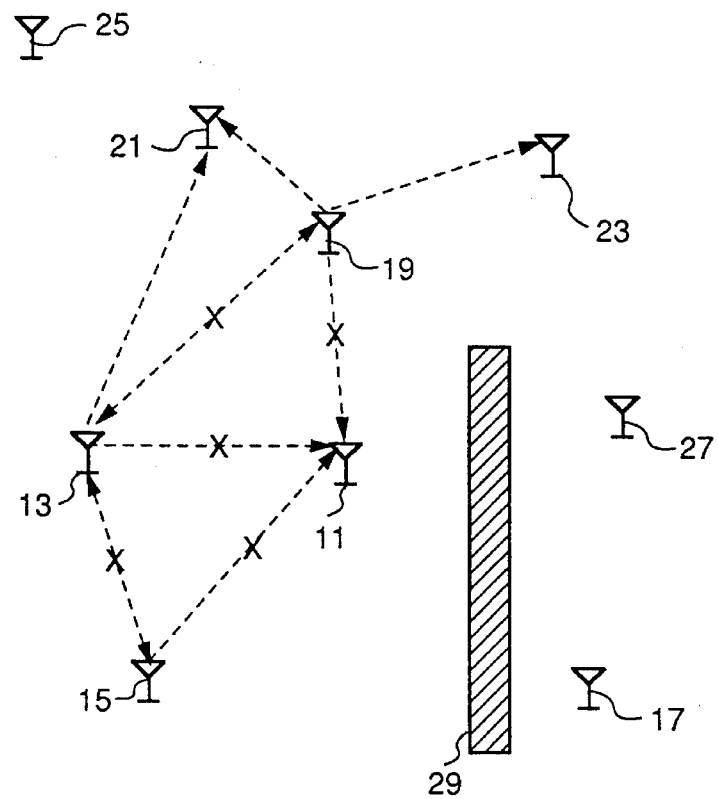
Figure 3C:
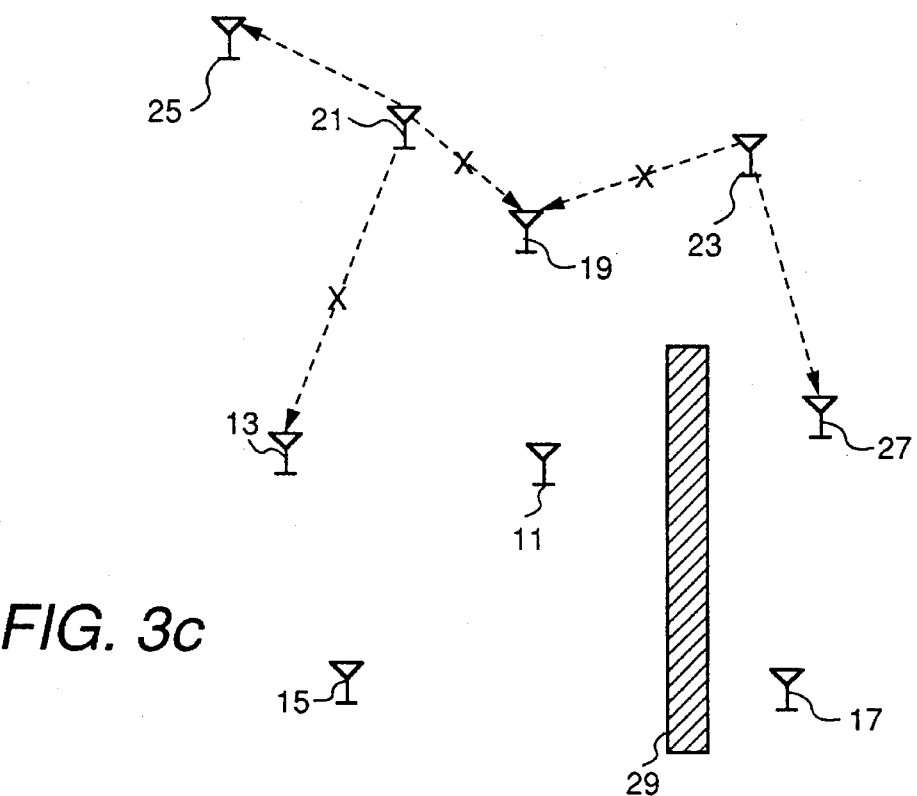

FIGS. 3a, 3b and 3c together illustrate the operation of the present invention. In FIG. 3a, an operator at transceiver 11 desires to transmit to transceiver 27 impaired by barrier 29. Transceiver 11 broadcasts its message, as a message packet to transceivers 13, 15 and 19 which are within its range and are unobstructed by barrier 29. Transceiver 17 did not receive the signal from transceiver 11 due to barrier 29. Transceivers 13, 15 and 19 check the 'EC' field of the message packet to determine errors. If no errors are detected, they send an acknowledge signal ("ACK") indicating that the message has been received with no errors, to transceiver 11. Transceiver 11 keeps track of the number of transceivers which have successfully received the message and if that number meets or exceeds the number in the 'ROBUSTNESS' field, the message packet is discarded, except for the 'MESSAGE ID' which is held in a rotating buffer replacing the oldest message ID when the buffer is full.

Transceivers 13, 15 and 19 compare the 'DESTINATION ID' number with their own internal, or stored, ID number. If the IDs match, the message has been successfully transmitted to its intended destination.

If the ID number of the message packet does not match their own ID, they determine if they have received this message by checking the 'MESSAGE IDs' in the rotating buffer. The value in the 'LIFETIME' field is added to the value in the 'TIME STAMP' field and compared to the current time to determine if the message expired. If there has not been an error in reception, the 'MESSAGE ID' does not match one in the rotating buffer and the message packet has not expired, the message packet is deemed to be 'valid'. Transceivers 13, 15 and 19 transmit valid messages to other transceivers in their range until they have transmitted to the number of transceivers indicated in 'ROBUSTNESS' field, or the message is no longer valid.

It is not critical in determining if the message packet is valid by changing the order in which it is determined if the message packet has been received before, if it has expired and if there was a transmission error, but that simply these be determined.

In FIG. 3b, transceiver 13 broadcasts to transceivers 11, 15 and 21; transceiver 15 broadcasts to transceivers 11 and 13; and similarly, transceiver 19 broadcasts the message to transceivers 11, 21 and 23.

After the broadcasts illustrated in FIG. 3b, all receiving transceiver check the 'EC' field 4, send an acknowledgement if no errors are detected, as before. They determine if the message packet is valid. If it is valid, they review the ID of the message packet and determine if that is their ID. If it is not their ID, they then broadcast the message packet to transceiver 11, 13 and 15 and 19 which are ignored, as represented in FIG. 3b. All ignored messages in the Figures are denoted by an "x".

In FIG. 3c, transceivers 21 and 23 broadcast the message. Transceiver 21 broadcasts to transceivers 13, 19 and 25. The message received by transceiver 13 and 19 is ignored since they have seen the message before. Transceiver 23 broadcasts the message packet to transceivers 19 and 27. Since transceiver 27 has an ID which matches that of the ID appended to the message packet, transceiver 27 keeps and stores the message packet. The message has been successfully transmitted around barrier 29 to reach its ultimate destination of transceiver 27.

In FIGS. 3a, 3b and 3c, the message spreads from its original transceiver 11 outward. The inward signal, the signal moving back towards the original transceiver, is ignored. In this fashion, message packets may swiftly be communicated without the need of complicated control signals and reach a destination around barriers.

This 'ripple effect' may also be employed in transmitting information to a desired receiver which is far outside of the range of the initiating transceiver.

In another embodiment, the mobile and fixed units continuously emit a very low power identification signal. When a mobile unit comes into the proximity of a fixed unit, the units mutually discover each other's presence and establish a wideband protocol, a short time, high volume exchange of packetized data.

Figure 4A:
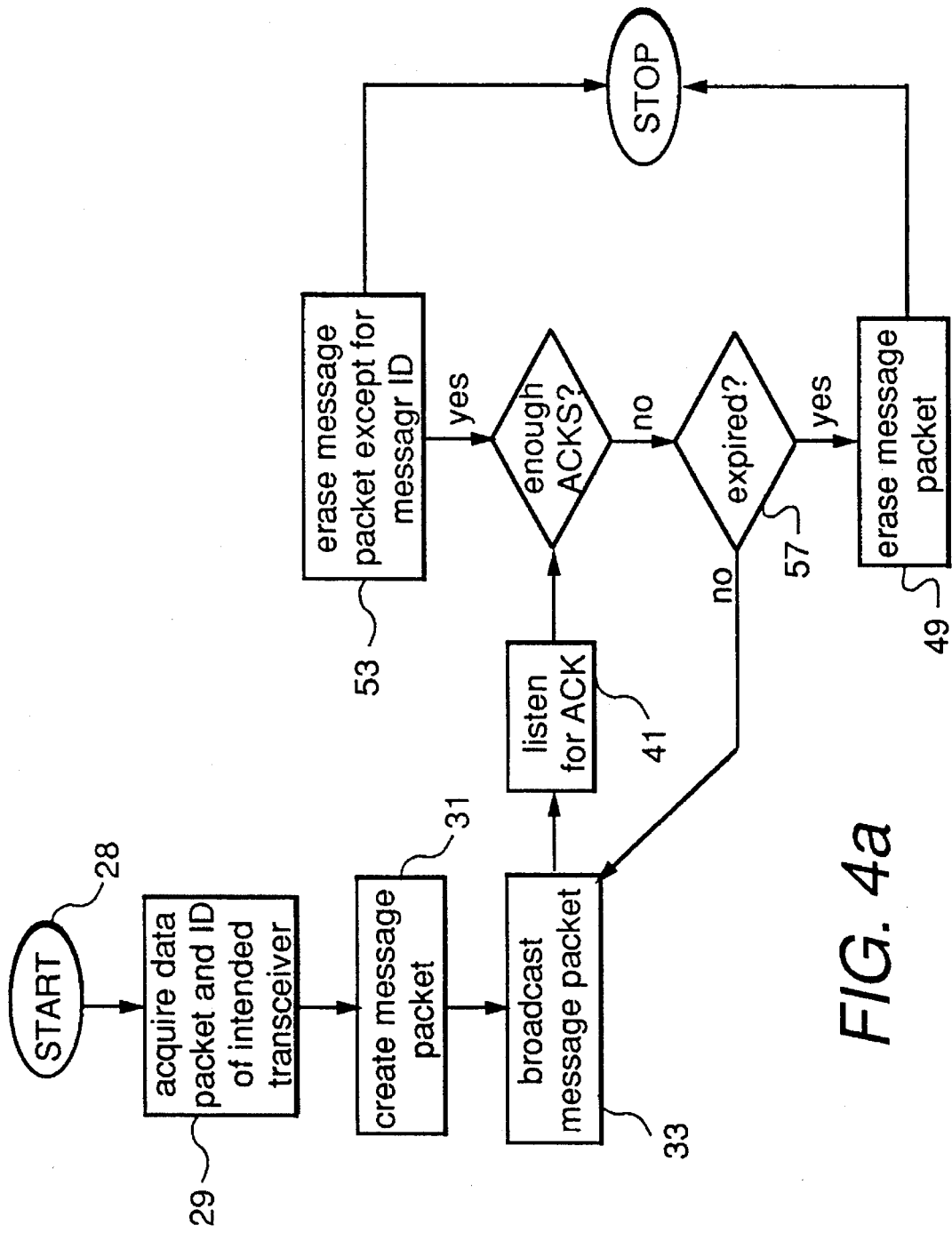
FIG. 4a is a simplified flow chart illustrating a method of initiating a message packet according to the present invention.

FIG. 4a illustrates a simplified flow diagram showing steps of initiating a message packet according to the present invention. The process begins at block 28. In block 29, information desired to be transmitted is acquired from a data source. The ID of the transceiver which this information is desired to be transmitted is also acquired by means of a look-up table, or other database. In block 31, a message packet is created according to FIG. 2. The initiating transceiver may have to synthesize portions of the message packet such as the 'MESSAGE ID', which should be unique for each message packet.

In block 33 the message packets are broadcast to all transceivers capable of receiving the data transmission. The transceiver listens for acknowledgement signals in block 41. It then compares the amount of acknowledgement signals which it has received with the number in the 'ROBUSTNESS' field of the message packet. If the transceiver has received enough acknowledgements, then the message is erased except for the message ID field of the message packet in block 53. This message ID field is used in determining if a message has been received before.

If the number of acknowledgements received by the transceiver is less than that required, processing continues at block 57. In block 57, the 'TIME STAMP' of the message packet is added to the 'LIFETIME' also in the message packet and is compared to the current time. If the current time is later than the time stamp plus the lifetime, then the message packet has expired. If it has expired, then the message packet is erased in block 49. If it has not expired, then the message packet is rebroadcast in block 33 and the remaining steps are performed as stated above.

Figure 4B:
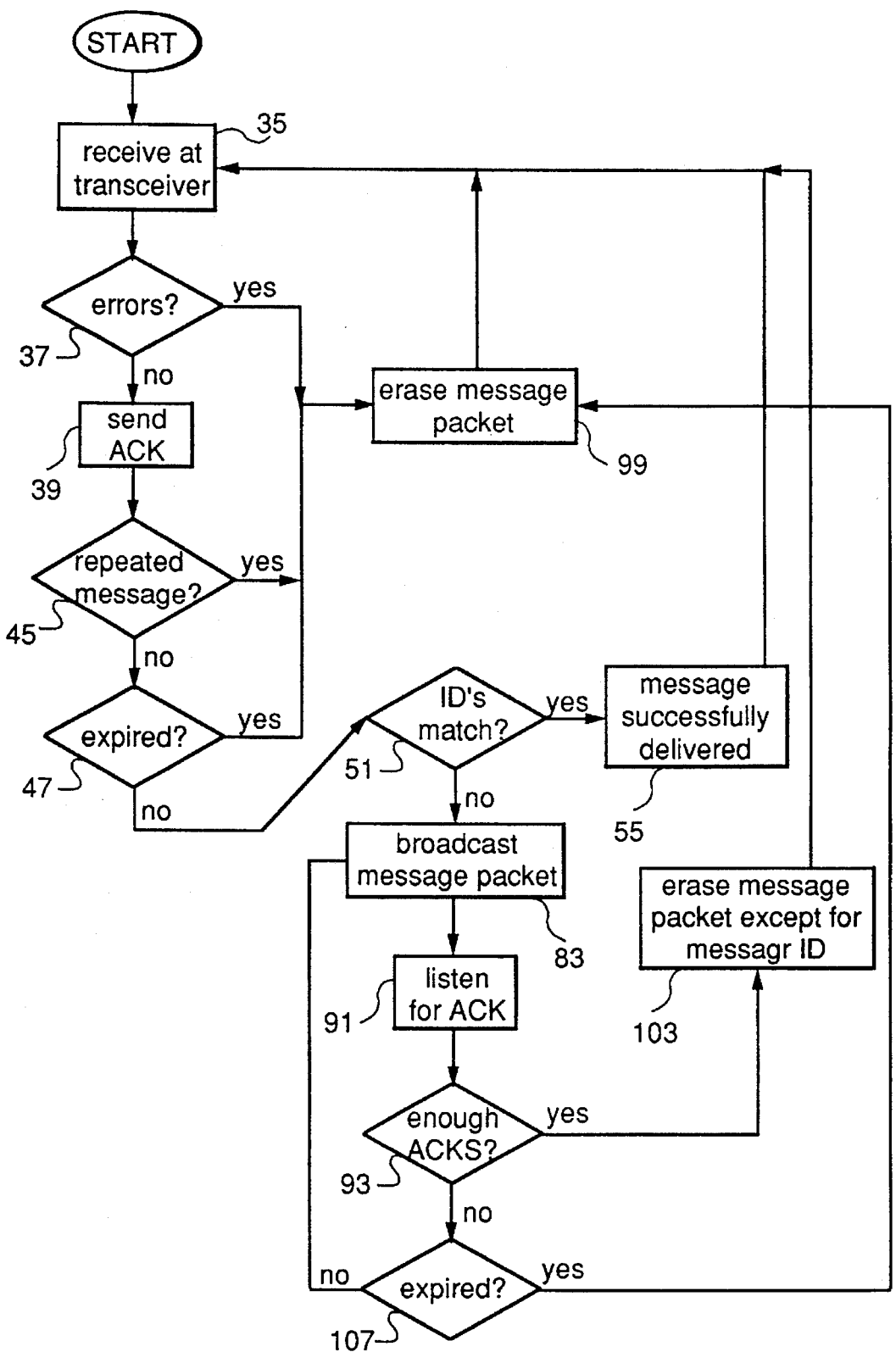
FIG. 4b is a simplified flow chart illustrating a method of receiving and re-transmitting a message packet according to the present invention.

In FIG. 4b illustrates the steps of receiving and re-transmitting a message packet according to the present invention. In block 35 the message packet is received at a transceiver. All transceivers which receive the message then determine if there were any errors in the transmission. This is done by checking the error correction field ("EC") of the message packet. This may be a cyclical redundancy check (CRC) or any other type of appropriate error detection technique. If the message is deemed to have been received without errors as determined in block 37, an acknowledgement signal is sent from the transceiver which has received the message packet in block 39. If there has been an error detected, then the message packet is erased in block 99.

Transceivers which have received the message packet then determine if the message packet is valid which means that the message packet has been received with no errors, the message packet has not been received before as indicated by the stored message IDs, and the message has not expired, as shown in blocks 37, 45 and 47, respectively. If any of these are true, then the message is not valid. Conversely, if all of these are false, the message packet is valid. In block 51, the transceiver receiving the message packet compares the transceiver ID of the message packet with its own unique transceiver ID. If the IDs match, then the message has been successfully transmitted to its intended transceiver in block 55. Processing then continues at block 35 in which the transceiver is a ready status waiting for new messages.

If the ID does not match that of the transceiver, then, in block 83 the message packets are broadcast to all transceivers capable of receiving the data transmission. The transceiver listens for acknowledgement signals in block 91. It then compares the amount of acknowledgement signals which it has received with the number in the 'ROBUSTNESS' field of the message packet. If the transceiver has received enough acknowledgements, then the message is erased except for the message ID field of the message packet in block 103. This message ID field is used in determining if a message has been received before.

If the number of acknowledgements received by the transceiver is less than that required, processing continues at block 107. In block 107, the 'TIME STAMP' of the message packet is added to the 'LIFETIME' also in the message packet and is compared to the current time. If the current time is later than the time stamp plus the lifetime, then the message packet has expired. If it has expired, then the message packet is erased in block 99. If it has not expired, then the message packet is rebroadcast in block 83 and the remaining steps are performed as stated above.

The process continues the remainder of the flow chart of FIG. 4b until the message packet has been successfully transmitted to the intended transceiver, or transceivers have tried transmitting the message packet the number of times defined in the 'ROBUSTNESS' field of the message packet, or the message packet expires.

Since the system is distributed, an error in one of the transceivers may not make a difference, in fact many errors in many receivers may also have no effect. In centralized systems, however, an error by the master controller causes errors in transmission. The present invention therefore exhibits a highly fault tolerant system for message transmission.

A problem may occur in which a transceiver may receive two message packets at the same time, known as a 'collision'. In FIG. 3b, transceiver 21 is shown receiving a message packet from both transceivers 13 and 19. If this occurs at the same time, there would be a collision sensed by transceiver 21. A collision is typically determined at a receiver. As transceiver 21 determines the collision has occurred, it may broadcast a signal to all transceivers in its local transmission area, that a collision had occurred. Transceivers 13 and 19 may receive this indication that a collision has occurred and re-transmit the message packet in one of the methods defined above.

Logic can be built into the transceivers such that when a collision is detected, the last message packet sent would be re-transmitted, but at a time period which is staggered from that in which the first message packet was sent. This may be done in a number of ways. When a collision is detected, the data may be sent during its predetermined time spot but offset within the time slot so as not to be sent at the same initiation time as previous message packet was sent.

Another possible method would be that of sending a message packet based upon a delay time after it was received. If a data collision has occurred, the delay time is either randomly extended or shortened according to known procedures.

In order to produce a realistic system implementing the present invention, motivation is required for each of the transceivers receive and pass on a message packet. One such method of providing this motivation is to charge each transceiver initiating or receiving a message packet a message fee. Intermediate transceivers which receive and re-transmit the message packet are 'paid', i.e., the message fee is reduced, by a fraction of the number of message packets that the transceiver relays. The amount they are 'paid' is a function of the number of transceivers defined in the 'ROBUSTNESS' field, and the length of the message. Similarly, the 'charge' for sending a message may be a function of message length, the 'ROBUSTNESS' value, and the 'LIFETIME' value. Therefore, each transceiver has an incentive to become a repeater station.

A tamper-proof credit accumulator register is installed which will keep track of the earned credit values. A log is also kept which records key parameters respecting the relayed packets such as the originator's ID, the persistence, the lifetime and the packet length. This log is electronically "dumped" every time the mobile unit passes within range of a log collection point. These electronic facilities are also distributed about the city and it is expected that most vehicles will be within range of one or more of the facilities many times each day. Should the vehicles memory become nearly full, it will be possible to empty the log into a log collection point by other gateways such as conventional or cellular telephone or other means. An accounting is performed periodically and based on the total of the credit values earned by the mobile repeater. A fixed repeater also maintains a similar log. This log is dumped periodically to the log collection point by telephone.

The debiting of the packet originators for communication service performed is done by analysis of the collected logs of the mobile and fixed repeaters. The bill to the originator is based on the number of successfully delivered packets.

Analysis of the logs will also allow the network to be monitored for the purpose of increasing ifs efficiency and overall values as well as identifying those components that are in need of maintenance.

In another embodiment, 'storefronts' may be set up in which message packets may be initiated, received, or passed on. These storefronts charge an operator for receiving a message addressed to them, or for initiating a message to be sent to a desired transceiver.

In one embodiment the mobile relay units are carried by those whose duties mostly keep them on the roadways in the city such as taxi cabs, public conveyance vehicles, delivery services and so on. This provides an ever changing and multi-opportunity situation in which to access potential repeaters.

In another embodiment, the transceivers may be a hand-held unit similar to a pager. Messages to be transmitted may be typed in, downloaded from a computer, or be voice which is digitized. There also may be capability of sending and receiving faxes.

In still another embodiment, an acknowledgement of receipt of the transmitted message to its intended destination unit is sent to the initiating unit in the same manner as the message sent by the initiating unit.

Since the method of message distribution is not centrally controlled, the fault tolerance is much greater. If an error or failure occurs in any portion of the system, there is enough redundancy to pass the message to the intended transceiver.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What we claim is:

1. A method of transmitting information over a mobile and fixed radio network having a plurality of transceivers, each with a unique internal ID number, comprising the steps of:
   a) obtaining message information desired to be transmitted;
   b) determining a destination identification number (ID) for a destination transceiver desired to receive information packet;
   c) creating a message packet having a message ID, the destination ID, the message information, and error detection bits;
   d) broadcasting the message packet from an initiating transceiver to transceivers within range;
   e) for each transceiver receiving the broadcast:
      1. checking the error detection bits for errors in the received message packet, and sending an acknowledgment signal if received with no errors,
      2. identifying if the message is a valid message packet, a valid message packet being one which was received without errors, has not expired and has a message ID which does not match stored message IDs,
      3. comparing the destination ID to the internal ID of the transceiver receiving the broadcast,
      4. storing and utilizing valid message packets which have destination IDs which match the internal ID of the transceiver receiving the broadcast, and
      5. re-broadcasting the valid message packets to other transceivers within range.

2. The method of transmitting information of claim 1 wherein the step of re-broadcasting valid message packets comprises the steps of:
   a) transmitting the valid message packet;
   b) listening for an acknowledgment ("ACK") signal from a recipient transceiver which has received the message packet without error;
   c) comparing a count of ACK signals received to a 'ROBUSTNESS' value in the message packet;
   d) deleting the message packet except for the message ID if the count of ACK signals meets or exceeds the 'ROBUSTNESS' value, and
   e) determining if the message packet has expired and erasing the message if it has expired, and
   f) repeating steps "a"–"f" until the message packet has expired or the count of ACK signals exceeds the 'ROBUSTNESS' value.

3. The method of transmitting information of claim 1 further comprising, after the step of re-broacasting the valid message packet, the steps of:
   a) detecting if a collision has occurred; and
   b) re-broadcasting valid message packet after a randomized delay period to reduce the possibility of another collision.

4. The method of transmitting information of claim 1 further comprising a step of sending an receipt message packet from the destination unit acknowledging receipt of the original message packet according to the steps of claim 1 wherein the message packet is the acknowledgment message packet, and the destination unit is the initiating transceiver.

* * * * *